United States Patent Office 3,218,241
Patented Nov. 16, 1965

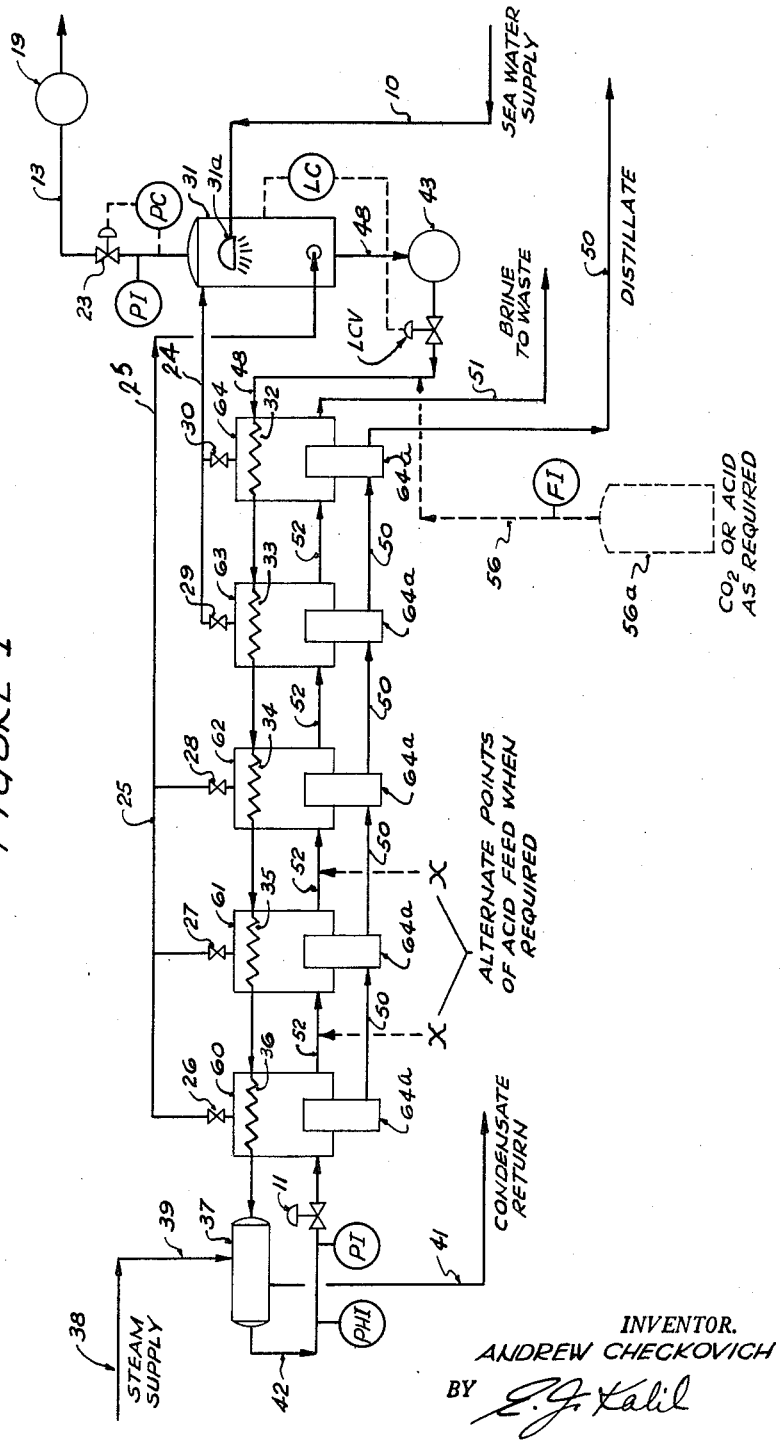

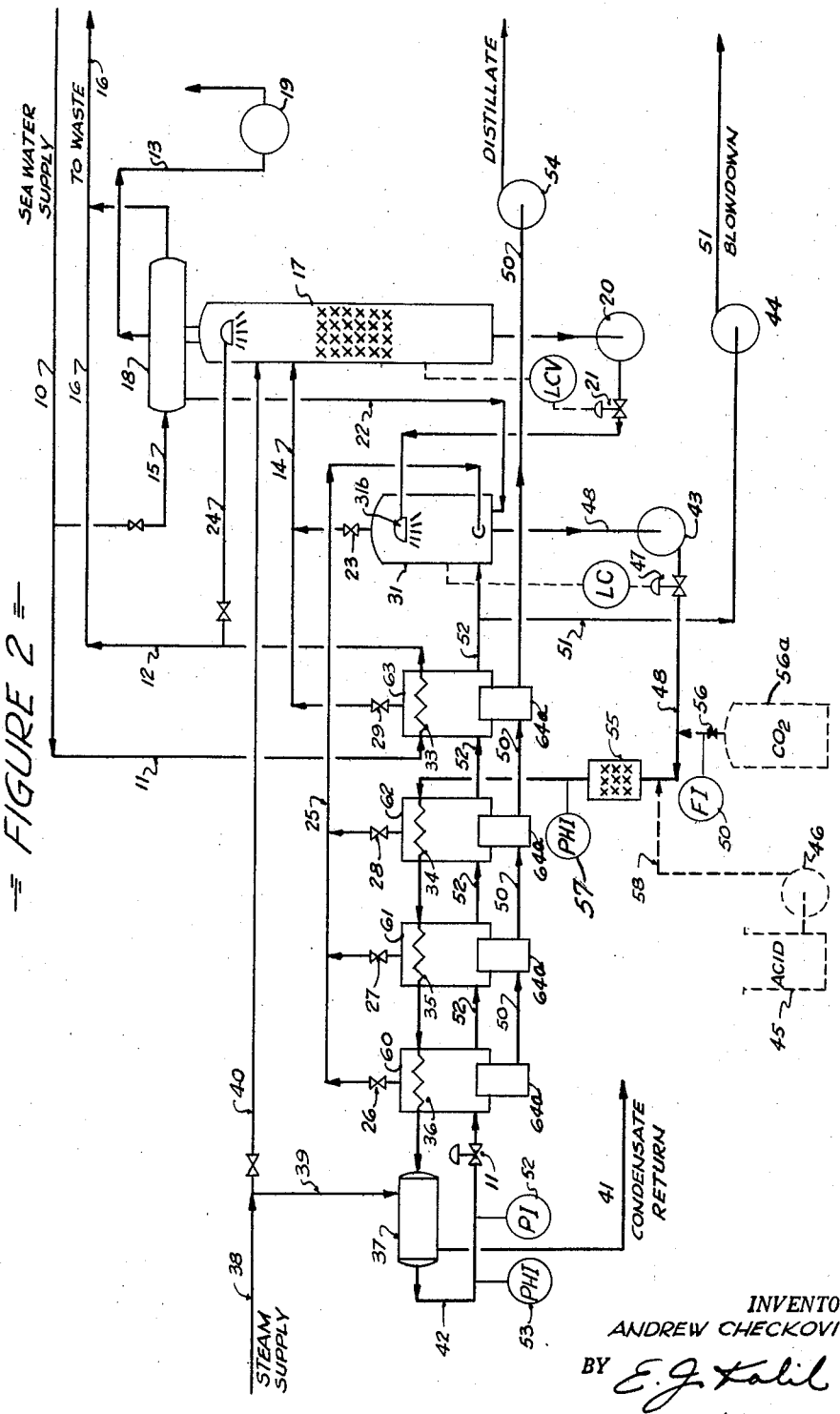

---

3,218,241
INHIBITING SCALE FORMATION IN FRESH WATER RECOVERY
Andrew Checkovich, South Norwalk, Conn., assignor, by mesne assignments, to Singmaster & Breyer, Inc., New York, N.Y., a corporation of New York
Filed Jan. 26, 1960, Ser. No. 4,740
3 Claims. (Cl. 202—53)

This invention relates to the recovery of fresh or potable water from water containing scale-forming ingredients and in particular to the production of fresh water from sea water by distillation or evaporation processes at elevated temperatures under conditions which substantially inhibit excessive calcium carbonate or magnesium hydroxide scale formation on the heat transfer surfaces.

The economy of producing fresh water from sea water by evaporation processes depends to a considerable extent on how large a temperature differential can be obtained between the evaporation temperature in the first or high temperature evaporator stage and the temperature of the evaporator brine being discharged from the unit. Commonly, the temperature of the evaporator brine being discharged is limited by the temperature at which the sea water is available, so that the lower temperature involved in the differential cannot be changed conveniently. The practical operating temperature of the first stage is limited by the tendency of the water to scale, and the principal obstacle to economical distillation of sea water at the present time is scale deposition on the evaporator and heat transfer surfaces at elevated temperatures.

A further disadvantage of operating at low temperatures is that the harmful effects of certain bacteria that may be present in sea water or other types of feed water may not be rendered sufficiently ineffective, in which case the incoming sea water or distillate containing bacteria carryover may require additional treatment before the fresh water produced is safe for human consumption.

Unless sea water is conditioned or otherwise properly treated, formation of calcium carbonate and magnesium hydroxide scale becomes a problem at evaporating temperatures above 160° F. to 170° F., even for relatively low brine concentrations. Higher temperatures are possible before calcium sulfate scale occurs.

Numerous methods for circumventing the scaling problems created by sea water distillation at elevated temperatures have been tried. Some of these methods are based on injection of chemicals such as U.S. Navy boiler compounds, Hagevap L. P., and other formulations containing metaphosphates directly into the evaporating sea water. At the present time, the upper temperature limit for sea water evaporation treated with these chemicals, is approximately 170° F. to 190° F.

Another method for inhibiting scale formation is to introduce ferric ions into the sea water, either by the addition of ferric chloride or by electrolysis. The electrolysis method produces ferric ions by passage of an electric current from iron anodes to carbon cathodes, using sea water as an electrolyte. Although satisfactory scale prevention is claimed for this method at 225° F. evaporating temperatures and at a concentration about 1.2 times normal sea water, this method is costly from both installation and operating standpoints. It also has the disadvantage of introducing iron sludge into the evaporating sea water which may interfere with heat transfer and give rise to other operating difficulties.

The problem of scale formation has also been dealt with by provision of techniques for removing the scale once it is formed. These methods include mechanical cleaning, chemical cleaning, and scale cracking or thermal shocking. A system requiring frequent use of any of these methods for scale removal, however, has the obvious disadvantage of capacity loss due to down time and lowering of heat transfer rates and equipment capacity and capability as the scale builds up on the heat exchange surfaces.

An effective method for the prevention of scale deposits on evaporator heat transfer surfaces at elevated temperatures is described in my U.S. patent application Serial No. 790,290 filed January 30, 1959. This method is based on treatment of the sea water to remove substantially all the M.O. alkalinity (methyl orange alkalinity) and non-condensable gases from the sea water and adjustment of the sea water pH value to the alkaline side before subjecting the sea water to evaporator treatment. Recent pilot plant operations of a two-stage basket type distillation system have demonstrated scale-free operation when producing fresh water from sea water conditioned according to this method at evaporation temperatures up to and above 240° F. and at overall brine concentrations about double that of the incoming sea water. In this operation, the total alkalinity of the treated sea water was reduced to an overage value below about 10 p.p.m. and required the addition of an acid, chemically equivalent to the amount of alkalinity reduction, which in this case was approximately 100 p.p.m. $H_2SO_4$ fed to the sea water being treated. However, this method imposes some limitations in some sea water evaporating plant installations where, because of space and weight limitations, and possible hazards, the use of liquid acids or the storage of a relatively large quantity of solid acid or acid compounds are undesirable, for example, for shipboard installation.

It is an object of this invention to provide a method which circumvents these disadvantages.

A primary object is to provide a method for the distillation of sea water in which relatively high temperatures can be employed without substantial scaling of heat transfer surfaces by feeding back into the distillation system a non-condensable by product which has a propensity to control the pH of the feed water to a value not exceeding that at which scale is prone to form.

A further object is to provide a method for distilling sea water in which relatively high temperatures can be employed without substantial scaling of the heat transfer surfaces, by the use of acid or acid forming compounds in amounts substantially less than that heretofore required, particularly less than the amount chemically equivalent to the total alkalinity which prevails in the sea water.

Another object of this invention is to provide a method for distilling sea water wherein the $CO_2$ released by the evaporation process is collected and reintroduced into the water to be heated in the evaporating system.

Other objects and advantages will more clearly appear from the following disclosure when taken in conjunction with FIGS. 1 and 2 of the drawings which show apparatus flow sheets which may be employed in carrying out various embodiments of the invention.

Broadly stated, the invention provides a method for inhibiting scale formation on heat exchanger surfaces in a distillation system which comprises subjecting feed water to distillation and then maintaining the concentration of dissolved carbon dioxide in the water being heated at a level sufficient to inhibit the hydrolysis of bicarbonate ions to carbonate ions. One method of accomplishing this comprises collecting at least a portion of the carbon dioxide released during the distillation and reintroducing said carbon dioxide into the feed water to be heated by the distillation.

With respect to improvement in the evaporation of fresh water from sea water, this invention is particularly concerned with multi-stage flash evaporation processes, although the collection of the carbon dioxide released by the evaporating system or its auxiliary equipment and its reintroduction into the water to be heated can be made applicable to other evaporating systems including those employing the basket or submerged type of evaporating equipment.

In one aspect of the invention involving the treatment of sea water for the recovery of fresh water therefrom or from water of similar composition, the method employed comprises subjecting the sea water to evaporation treatment, collecting the $CO_2$ released from the evaporator system and reintroducing the collected $CO_2$ into the water to be heated by the evaporating system and venting the evaporating system of other non-condensible gases.

As an additional embodiment, with the aim of further inhibiting scale formation at higher temperatures, the method also provides for chemically treating the water to be evaporated by adding an acid or acid-producing compound, e.g., $CO_2$, $H_2SO_4$, $NaHSO_4$, and the like, to the water to be heated by the evaporator system to control the pH or to reduce the alkalinity therein to a value which will inhibit calcium carbonate and magnesium hydroxide scale formation. The amount of acid or acid-producing compounds required will be at least substantially chemically equivalent to the amount of any carbonate ions remaining after the $CO_2$ released from the evaporating system is introduced into the feed water plus the amount necessary to maintain the pH of the evaporator feed water at the required value. It is to be understood that the term "carbonate ion" as employed herein is meant to include $(CO_3^=)$ ion and not carbonate in the form of $(HCO_3^-)$ ion or dissolved $CO_2$.

The inhibition of calcium carbonate and magnesium hydroxide scale formation according to this invention will be readily apparent from the consideration of the factors contributing to scale formation and prevention and upon consideration of the embodiments of the method of the invention set forth in the accompanying drawings.

The formation of calcium carbonate and magnesium hydroxide scale of untreated sea water is a function of pH, temperature, calcium and magnesium concentrations and total alkalinity. With increasing temperature, conversion of bicarbonate $(HCO_3^-)$ ions to carbonate $(CO_3^=)$ ions takes place with the formation of carbonic acid $H_2CO_3$ or dissolved $CO_2$ according to reaction (a) shown below. As the temperature increases, the carbonate ions tend to decompose to form carbonic acid according to reaction (b) and a rise in the pH value occurs as $(OH^-)$ ions are formed when the carbonic acid decomposes according to reaction (c) and $CO_2$ gas leaves the system.

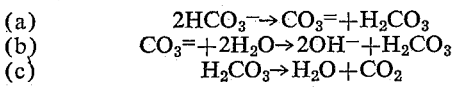

If reactions (a) and (b) are allowed to proceed in the direction indicated, the calcium and magnesium present in the water will combine with the $(CO_3^=)$ ions and $(OH^-)$ ions respectively to form calcium carbonate and magnesium hydroxide scale. However, if the dissolved $CO_2$ gas is prevented from leaving the water solution being heated and the amount of $CO_2$ is sufficient to exert adequate partial pressure, the above reactions will tend to proceed in the opposite direction from that shown and scale formation will be inhibited.

I have found that by maintaining the requisite amount of dissolved $CO_2$ in the water being heated in a flash evaporator system or other indirect heat exchange system, the formation of $(CO_3^=)$ and $(OH^-)$ ions will be retarded and scaling on heat transfer surfaces will be greatly inhibited. By maintaining the water being heated in the evaporator heater circuit at an adequate pressure higher than that corresponding to its saturation temperature, any $CO_2$ which leaves the water being heated within this portion of the system will be caused to redissolve by virtue of the build-up in the partial pressure of $CO_2$. When the heated water leaves the evaporator heater circuit and is evaporated in the various evaporation stages, the $CO_2$ which is released is collected and reintroduced into the circuit.

In the case of the flash evaporator system, when the heated evaporator feed water enters the first or high temperature flash evaporator stage, a substantial amount of $CO_2$ will be released with the flashing vapor, which will thereafter be condensed and collected to form distillate product. The released $CO_2$ will be collected and reintroduced into the evaporator feed water to be heated. Similarly, released $CO_2$ from subsequent stages will be collected and reintroduced into the evaporator feed water to be heated. The last stage or stages of a multi-flash evaporator system can be vented of non-condensible gases to a degasifier or other vent system without an appreciable loss of $CO_2$, since the amount of $CO_2$ released at the lower temperatures obtaining would be relatively small.

The release of carbon dioxide from the evaporator brine in the flash stages will increase the carbonate alkalinity and pH value of the brine which will retard corrosion of iron and steel surfaces. However, the formation of $(CO_3^=)$ ions may tend to precipitate some calcium carbonate and possibly some magnesium hydroxide, depending upon the temperature and depending upon the total alkalinity in the brine.

Since the brine in contact with the flash evaporator surfaces is not subjected to heat, the thermal efficiency of the system will not be impeded. Should deposits occur on the flash evaporator surfaces in contact with the flashing brine their removal can be accomplished by mechanical means or by normal chemical cleaning procedures which need not be described here. Their formation in this part of the cycle can be retarded by the addition of chemicals such as the glassy phosphate or chemicals which have chelating or wetting properties.

Particularly at high temperature operation where these deposits may become especially troublesome, I may add acid to the brine flowing between the flash stages to reduce the carbonate ions and impede scale formation. It will be appreciated that to control deposits the acid addition will be required only in the higher temperature stages, e.g. above about 170° F. and the amount necessary will be that required to keep the carbonate $(CO_3^=)$ ions below a few p.p.m.

An analysis of an average sea water, which can be considered typical, is set forth in column (a) of Table I, and there is also included in columns (b) and (c) a corresponding analysis of an evaporator feed water after treatment in accordance with the method of the invention. The analysis in column (b) represents that which obtains after mixing the average sea water and recycle $CO_2$ and any additional $CO_2$ that may be required to produce evaporator feed water having the desired pH value for a once through flash evaporator system.

The analysis in column (c) is typical of that obtaining after mixing of the average sea water with recycled brine, and recycled carbon dioxide, and after the addition of sufficient carbon dioxide to the mixture to inhibit scaling in the evaporator heat exchange surfaces. In this example, the concentration of the blowdown or evaporator brine being discharged to waste is approximately 1.5 times the concentration of the average sea water.

The amount of $CO_2$ to be added to the evaporator feed water to inhibit scaling of the heat transfer surfaces should be sufficient to convert carbonate $(CO_3^=)$ ions to the bicarbonate $(HCO_3^-)$ ions which will take place at a pH value below approximately 8.2. It is preferred that sufficient carbon dioxide be added to maintain the pH value between 8.1 to 7.5 for the conditions set forth in the examples and figures set forth in this specification.

For other conditions, particularly for higher temperature (e.g., 215° F. to 230° F.) and/or total alkalinity concentrations above 100 p.p.m., the lower pH value of 7.5 is preferred and it may even be desirable to reduce the pH below 7.5 under conditions of even higher temperatures. At higher temperature conditions, e.g., above about 225° F., inhibition of scale to a greater degree can be obtained by the use of acids or acid compounds in conjunction with recycle $CO_2$ in the sea or feed water treatment to reduce the total alkalinity to a value below about 100 p.p.m. in the water being heated by the evaporator system.

TABLE I

*Composition of an average sea water and corresponding evaporator feed water treated to inhibit scale formation*

|  | (a) Average sea water | (b) Once through evaporator feed water | (c) Recycle brine evaporator feed water |
|---|---|---|---|
| Calcium Ca | 410 | 410 | 557 |
| Magnesium Mg | 1,300 | 1,300 | 1,768 |
| Sodium Na | 10,800 | 10,800 | 14,700 |
| Potassium K | 390 | 390 | 530 |
| Chloride Cl | 19,450 | 19,450 | 26,450 |
| Sulfate $SO_4$ | 2,700 | 2,700 | 3,670 |
| Total alkalinity ($CaCO_3$) | 115 | 115 | 156 |
| Total solids | 35,165 | 35,165 | 47,831 |
| P alkalinity | 0–5 | 0 | 0 |
| Dissolved gases | Varies | 3–13 | 4–16 |
| Dissolved oxygen | Varies | 1 | Trace |
| Free $CO_2$ | Varies | 2–12 | 3–15 |
| pH value | 7.9–8.2 | 7.3–8.0 | 7.3–8.0 |

The term "total alkalinity" employed herein means methyl orange alkalinity. Thus, total alkalinity is equivalent calcium carbonate content in units of parts per million corresponding to the methyl orange end point as determined by titration with a standard acid. The term "P alkalinity" is equivalent calcium carbonate content in units of parts per million corresponding to the phenolphalein end point as determined by titration with a standard acid.

It is apparent from the disclosure hereinbefore that unless the $CO_2$ in the feed water is maintained at a requisite value, scale formation becomes a problem, other things being equal. Assuming, as is generally the case in actual practice, that the $CO_2$ released in a flash evaporator system is irretrievably lost, the pH of the feed water will gradually increase to a value above 8.2 at a temperature above about 170° F. due to the hydrolysis of bicarbonate ion to carbonate ion. As this occurs, the tendency to scaling increases to such an extent that the temperature to which the feed water is heated by the evaporator heater must be reduced to counteract the scaling effect. When such conditions prevail, it may be necessary to control the temperature so that it does not exceed 160° F. This is more likely to occur when evaporating some sea waters which have more than the average alkalinity and pH value. Since this will result in a decrease in temperature differential of the evaporation process, the economics of the process become adversely affected.

On the other hand, by recycling $CO_2$ released by flash evaporation supplemented, when necessary, with bottled $CO_2$, it is possible to depress the pH of the feed water being heated to a value sufficient to inhibit scale formation at temperatures of about 170° F. and higher for all sea water compositions. Thus, it is possible with this type of control to use top temperatures ranging from about 170° F. to 220° F. without undue scaling on heat transfer surfaces.

As has been stated hereinbefore, this is particularly advantageous on shipboard where it would be undesirable to have large stocks of acid, e.g. $H_2SO_4$, for treating evaporator water. Thus, by using recycle $CO_2$ in the process, the necessity of using large amounts of acid is dispensed with. By supplementing the recycle $CO_2$ with bottled $CO_2$, it is possible, without the use of acid, to obtain adequate temperature differential as aforementioned for economic operation.

Where it is desired to use still higher temperatures, e.g. temperatures substantially above 220° F., total alkalinity becomes a factor even though the pH might be within the range of 7.5 to 8.0. In such situations, I might combine the use of an acid with recycle $CO_2$ or with the combined use of recycle $CO_2$ and bottled $CO_2$ and control the pH to as low as 7.0 to 7.2. By using such a combination, for example recycle $CO_2$ and acid, considerably less acid would be used to effect the desired result, than if the acid alone were used. The employment of an acid or acid compound that will react with the carbonate and bicarbonate ions has the advantage that the total alkalinity of the evaporator feed water being subjected to heating is reduced in comparison with the use of carbon dioxide as the treating chemical. Assuming, for example, that sulfuric acid is employed as the treating chemical, its reactions with carbonate and bicarbonate alkalinity will be in accordance with reactions (d) and (e) below:

(d) 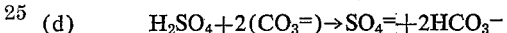 $H_2SO_4 + 2(CO_3^=) \rightarrow SO_4^= + 2HCO_3^-$ (e) 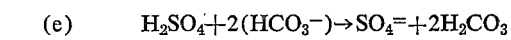 $H_2SO_4 + 2(HCO_3^-) \rightarrow SO_4^= + 2H_2CO_3$ It will be noted from the above reactions that the addition of a given amount of acid will result in a reduction of alkalinity chemically equivalent to the amount of acid employed, and that carbonic acid or dissolved $CO_2$ is formed. In carrying out this embodiment, it may be advantageous to add to and mix a portion of the acid with the sea water entering the deaerator, to reduce the alkalinity of the sea water and hence the alkalinity of the water being subjected to heating by the evaporator system. As stated hereinbefore, the acid may also be added to the brine flowing between the high temperature flash stages to reduce scaling tendencies in the evaporating brine circuit.

I have found that my invention is applicable to a once through multi-stage flash distillation system as well as to a system in which brine recycle is used.

By a once through system is meant that system employed in the distillation treatment of, for example, sea water, wherein, after a single passage of sea water through the system, the residue water or brine concentrate formed is separated, discarded, and replaced completely by fresh sea water to be distilled, the replacement sea water being equal to the amount of residue discarded plus the amount of condensate produced. In such a system, the solids concentration of the water being heated is substantially the same as the concentration of the incoming water to be distilled.

After equilibrium conditions are established, the amount of carbon dioxide released for collection and introduction to the evaporator feed water will depend upon the pH value or the amount of dissolved or free $CO_2$ in the feed water being heated in the heating portion of the cycle and upon the amount of conversion of the bicarbonate ion to carbonate ion in the flash or evaporation portion of the cycle. Other conditions being equal, as operating temperatures are increased, there is a greater conversion of bicarbonate to carbonate and more carbon dioxide is released from the flashing or evaporating brine for collection and introduction to the feed water. The advantage of using higher temperatures therefore provides an additive effect with respect to carbon dioxide recovery. For example, water heated to 215° F. followed by flash evaporation will result in a greater release of carbon dioxide during flash evaporation than water initially heated to say 170° F. Since more carbon dioxide is made available at higher distillation temperatures, then more can be reintroduced into the incoming sea water resulting in a greater depressive effect on the pH and hence further improvement in the inhibition action on scale formation.

Where an efficient $CO_2$ collection and recycle system is employed, wherein the loss of carbon dioxide is kept to a minimum, additional chemicals, e.g. bottled $CO_2$ or acid may not be required to depress the pH of the evaporator feed water to the desired values for inhibiting scale formation in the heating portion of the cycle. To further inhibit scale in the heated feed water circuit particularly at higher temperatures above about 170° F. and to also inhibit scaling tendencies on the evaporator surfaces in contact with the evaporating brine, I propose to maintain the pH of the evaporator feed water at a value below 8 and preferably at about 7.5 and possibly lower to a value of about 7.0 Although even lower pH values would tend to further retard calcium carbonate and magnesium hydroxide scale formation, operation at pH values above 7.0 are preferred to mitigate corrosion problems.

At initial flash evaporation temperatures of from about 150° F. to 220° F. I propose to maintain the evaporator feed water pH values of from approximately 8.0 to 7.5 respectively, while at higher temperatures of from about 220° F. to 240° F. and higher, feed water pH values of 7.5 to 7.3 and even lower to about 7.3 to 7.0 are in order to inhibit scaling on the heat transfer surfaces. At the higher temperatures, I may add acid in combination with recycle $CO_2$ to reduce total alkalinity to below 100 p.p.m. and possibly to about 50–60 p.p.m. and thereby further reduce scaling tendencies in the heated feed water circuit and particularly inhibit scaling on the evaporator surfaces in contact with the evaporating brine.

An average sea water as shown in Table I or water of similar characteristics resulting in an average total alkalinity of 115 p.p.m. in the evaporator feed water requires a dissolved or free $CO_2$ content of about 8 to 12 p.p.m. to depress the pH value to about 7.5 to 7.3, respectively. For a total alkalinity of about 160 p.p.m. for example as might prevail in a brine recycle system, the free $CO_2$ content required is about 10 to 15 p.p.m. while for a total alkalinity of about 60 p.p.m., whether in a once through or a brine recycle system, the free $CO_2$ content should be about 4 to 6 p.p.m. to result in the same pH value of about 7.5 to 7.3.

As illustrative of one embodiment of the invention utilizing the once through system, reference is made to FIG. 1 which shows an apparatus flow sheet for recovering fresh water from sea water in a multi-stage flash distillation system. In this system, carbon dioxide released at the higher temperature flash evaporator stages is collected for recycle into the system and introduction into the feed water to be heated replacing the brine and distillate produced.

In FIG. 1, the system there depicted includes an evaporator heater 37 and a flash evaporator system including first flash evaporator stage 60, followed by a plurality of flash stages 61, 62, 63 and 64.

Sea water, or water of similar characteristics, enters the plant through line 10 which enters near the top of $CO_2$ absorption tank 31 where it is released through sprayer 31a to promote release of non-condensable gases from the sea water and mixing with collected $CO_2$ fed into the absorption tank through recycle line 25. Non-condensable gases are removed through line 13 by means of vacuum pump 19 which also maintains the proper pressure in the absorption tank controlled at a value to insure solution of the $CO_2$ in the sea water and to remove the bulk of other non-condensable gases.

The $CO_2$ treated sea water in absorption tank 31 is transferred through line 48 and evaporator feed pump 43 through heat transfer tubes or coils 32, 33, 34, 35 and 36 of flash evaporator stages 64 to 60, respectively, then through indirect evaporator heater 37 and from there through line 42 into the flash section of first evaporator stage 60. Line 42 has connected to it a pH meter indicator PHI, a pressure indicator PI and a pressure control valve 11.

Steam for evaporator heater 37 may be provided by a boiler or other source (not shown). The steam enters the plant via line 38 and passes through line 39 to the evaporator heater. Condensate from the heater is collected in line 41 and may be returned to the steam producing system circuit.

As the evaporator feed water flows through heat transfer coils 32, 33, 34, 35, 36, it is preheated while serving as condensing media for the flash evaporators. The feedwater which enters evaporator heater 37 from heat transfer coil 36 reaches its maximum temperature at the discharge end of the evaporator heater 37. The heated feed water flows from the evaporator heater 37 through line 42 and valve 11 into flash evaporator 60. Its pressure is controlled at a few pounds above that corresponding to its saturation temperature by means of pressure control valve 11, the pressure being read on indicator PI before the valve. It may be desirable here to control the pressure at even more than a few pounds above saturation to assure the maintenance of high partial pressure of any $CO_2$ expelled during heating and to insure its resolution in the heating system circuit.

The brine from the first stage evaporator 60 flows via line 52 to flash evaporators 60 to 64 and is discharged to waste via line 51 and pump (not shown).

As the brine flows through the flash evaporators, vapor released from the brine is condensed by coils 36 to 32 and is collected in wells 64a. The distillate is removed via line 50 by means of a pump (not shown) and becomes the fresh water product. The evaporator stages are provided with vent lines which remove the bulk of non-condensable gases and the $CO_2$ released from the flashing brine. Valves 26 to 30 are provided to control adequate removal of gases without excessive removal of water vapor. The $CO_2$ from evaporator stages 60, 61, 62 along with other non-condensable gases that may be released is collected in line 25 and is introduced in the body of the feedwater in the $CO_2$ absorption tank as shown in the figure. The vent from flash stages 63 and 64 may be connected to the absorption tank near the top via line 24 as shown or directly to vacuum pump 19 suction line 13. The $CO_2$ emitting from the latter two stages will be relatively small because of the low temperatures employed in these stages.

While the recycled $CO_2$ may be introduced into the feed water at various points in the system, it is preferred that it be introduced into the feed water before the water enters evaporator heater 37 and preferably before its temperature reaches about 150° F. The preferred method is that shown in FIG. 1 although the $CO_2$ may be introduced into the feed water line at other points in the feed water circuit. Where bottled $CO_2$ is being used to supplement the recycled $CO_2$, it may be introduced through line 56 from bottle 56a, the amount introduced being controlled by flow meter F1, line 56 being connected to line 48 as shown. Alternatively, instead of adding $CO_2$, acid may be introduced through line 56.

When using $CO_2$ absorption tank 31, vent line 13 and pressure control valve 23 is provided to permit control of pressure in this tank. This pressure should be set low enough to assure adequate gas flow from $CO_2$ collection line 25, but above the vapor pressure of the water within the tank to assure a substantial absorption of carbon dioxide.

As the evaporator feed water flows through line 48, acid may, as stated hereinbefore, be added thereto from line 56, as a supplement to recycle $CO_2$ by utilizing a suitable mixing device, the purpose being to reduce total alkalinity, thereby making possible even higher operating temperatures. Alternatively, acid may be added to the sea water inlet line 10 to reduce total alkalinity or at points X between the flash evaporator stages, e.g. between 60 and 61 or between 61 and 62, and the like, as may be desired, to inhibit any scaling that might occur on flash evaporator surfaces. Particularly at higher temperatures or where more stages are used, I may add $CO_2$, or wetting, or chelating agents to the brine flowing between the higher temperature stages for scale inhibition in the brine circuit.

The use of bottled $CO_2$ instead of acid or acid compounds to supplement recycle $CO_2$ is advantageous for shipboard or other installations where storage or handling of acids would be undesirable or economically impractical.

With respect to absorption tank 31, in order to insure adequate control of the conditions therein, a level control device LC is employed to control the level in the tank, wherein by sensing and coupling means, level control valve LCV in line 48 is caused to control the rate of sea water being withdrawn from the tank by pump 43.

An example illustrating the carrying out of the once through system is given as follows:

EXAMPLE 1

Sea water at the rate of 200,000 lbs./hr. having an approximate composition indicated in column (a) of Table 1 is drawn at the indicated rate through line 10 at a temperature of about 85° F. The system is applicable to other sea water temperatures with only minor adjustments necessary which will be obvious to those skilled in the art.

The sea water enters $CO_2$ absorption tank 31 via sprayer 31a. Recycle $CO_2$ entering the tank via line 25, preferably below normal water level, from the flash evaporators is caused to dissolve substantially in the sea water, the treated sea water thereafter being withdrawn from the tank through line 48 by means of pump 43 and control valve LCV, the water level in the tank being controlled by the level control device LC which is coupled to actuate valve LCV.

The evaporator system is designed to pump the feed water from absorption tank 31 through heat exchanger coils 32 to 36 of evaporators 64 to 60 so that by the time the water reaches evaporator heater 37 it is preheated to about 185° F. Evaporator heater 37 is heated by steam supplied by line 38 at the rate of about 6,200 pounds per hour at a pressure of 30 p.s.i. absolute and at an enthalpy of 1164 B.t.u./lb. The sea water leaves heater 37 and enters line 42 at a temperature of about 215° F. where it is controlled via valve 11 to a back pressure above saturation, for example a pressure of about 20 to 25 p.s.i. absolute, to prevent as far as possible dissolved $CO_2$ from leaving the feed water being heated.

The brine entering evaporator 60, which is at about 195° F. and 10.17 p.s.i. absolute, is flash vaporized whereby some $CO_2$ is released, collected and drawn off through valve 26 for recyling purposes through line 25, while about 3950 lbs. per hour of fresh water are condensed in well 64a. The residue brine leaving evaporator 60 at about 195° F. is then flash vaporized in evaporator 61 which is at about 175° F. and 6.56 p.s.i. absolute. The $CO_2$ released there is likewise collected and drawn off via valve 27 for recyle, while about 3800 lbs. per hour of water are collected in well 64a. The residue brine leaving evaporator 61 is further flash vaporized in evaporator 62 which is at about 155° F. and 4.1 p.s.i. absolute, the $CO_2$ being similarly drawn off while 3700 lbs. per hour of flash water are collected in the well. The residue brine from this evaporator is then led into evaporator 63 which is at about 135° F. and 2.48 p.s.i. absolute while 3550 lbs. per hour of water are collected in the well, the residue brine being lastly led to the fifth stage evaporator 64 which is at about 115° F. and 1.44 p.s.i. absolute, with about 3400 lbs. per hour of water being recovered in the well. The latter two stages are vented via valves 29 and 30 through line 24, which is shown connected to absorption tank 31 above the level of the water. Line 24 could also be connected to the suction of vacuum pump 17 or to other source of vacuum.

A total of about 18,000 lbs. per hour of distillate are collected and removed via line 50 by means of a pump (not shown). The residue brine which is the difference between the amount fed into the system and the amount recovered as distillate is removed through line 51 and discharged to waste.

For these operating conditions, the pressure in absorption tank 31 should preferably be maintained at a value of about 1.3 p.s.i. absolute. This will permit adequate flow of gas from line 25, and should result in a substantial absorption of the $CO_2$ while permitting the bulk of other non-condensable gases to leave the system. As a deterrent to corrosion, I may add an oxygen scavenger such as sodium sulfite to the evaporator feed water leaving $CO_2$ absorption tank 31.

As illustrative of another embodiment of the invention shown in FIG. 2, fresh water is recovered from sea water in a multi-stage flash distillation system, wherein a portion of the evaporation residue is recycled to the evaporator operation and the feed water to be heated by the evaporation system is treated according to the invention. This treatment includes the collection of carbon dioxide released by the higher temperature flash evaporator stages, reintroduction of said recyled carbon dioxide into the water to be heated by the evaporator system, and the addition, when necessary, of an acid or acid producing chemical into the water to be heated by the evaporator system.

Referring to the drawing in which like parts are similarly designated as in FIG. 1, the plant there depicted includes a vacuum deaerator 17, an evaporator heater 37, and a flash evaporator system including first flash evaporator stage 60, a plurality of flash stages 61 and 62, and final flash evaporator stage 63.

Sea water, or water of similar characteristics, enters the plant through line 10, passes through line 11 to heat exchanger 33 of flash evaporator stage 63, where it is partially heated and part of which flows through line 24 to vacuum deaerator 17, where after deaeration it serves as make-up to the flash evaporation system. The remaining sea water required for evaporator stage 63, but not required for make-up, is discharged to waste through line 16. Part of the cold sea water from line 10 flows through line 15 to serve as cooling water for deaerator vent condenser 18. Non-condensable gases are removed through line 13 by means of vacuum pump 19, which also maintains the proper deaerator pressure. Heat in the form of steam required for deaeration is introduced via line 40.

Although deaeration of the sea water prior to its introduction to the evaporator system is not essential for inhibiting scale formation according to the method of the invention, the use of a deaerator will remove the bulk of non-condensable gases from the sea water. The presence of non-condensable gases in the evaporator circuit would decrease heat transfer rates, and the reduction of oxygen will decrease corrosion. Deaeration will also remove some of the carbon dioxide that may be present in the sea water; however, the loss of $CO_2$ will be relatively small, since the deaeration is performed at a relatively low temperature. Some of the $CO_2$ that would otherwise be lost can be reclaimed by introducing the vent condenser drips, which will contain carbon dioxide, into the $CO_2$ dissolving tank 31 through line 22.

The makeup sea water is pumped by pump 20 through level control valve LCV or 21 into $CO_2$ absorption tank 31 through sprayer 31b, where it mixes with brine from flash evaporator stages 63, and where recycle $CO_2$ from line 25 is dissolved by the mixture which becomes the evaporator feed water.

From $CO_2$ absorption tank 31, which also serves as a pump suction head tank, the evaporator feed water is transferred through line 48 and evaporator feed pump 43 through heat transfer tubes or coils 34, 35, 36 of flash evaporator stages 62, 61, and 60, respectively, through indirect evaporator heater 37 and into the flashing section of first evaporator stage 60.

Steam for evaporator heater 37 can be provided by a boiler or other source (not shown). The steam enters the plant via line 38, and passes to line 39 to the evaporator heater. Condensate from evaporator heater 37 is collected in line 41 and may be returned to the steam producing system circuit. The steam supply line 38 is also connected to line 40 to provide any additional heat necessary for operation of deaerator 17.

As the evaporator feed water flows through heat transfer coils 34, 35 and 36, it is preheated while serving as condensing media for the flash evaporators. The feed water which enters evaporator heater 37 from coil 36 reaches its maximum temperature at the discharge of evaporator heater 37. In flowing from evaporator heater 37 through line 42 into flash evaporator 60, the feed water is controlled at a pressure a few pounds above its corresponding saturation temperature by means of pressure control valve 11. It may be desirable here to control the pressure at even more than a few pounds above saturation to assure the maintenance of high partial pressure of any $CO_2$ expelled during heating and insure its re-solution in the heating circuit.

Brine from the first stage evaporator 60 flows via line 52 to flash evaporator 61, 62 and 63, and finally into $CO_2$ absorption tank 31. Excess brine from flash evaporator 63 is discharged from the system through line 51 and pump 44 at a rate to maintain the desired feed water concentration.

As the brine flows through flash evaporators 60, 61, 62 and 63, vapor released from the brine is condensed by coils 36, 35, 34 and 33 and is collected in wells 64a. The distillate is removed via line 50 and pump 54, and becomes the fresh water product. The evaporator stages are provided with vent lines which will remove the bulk of the carbon dioxide released from the flashing brine. The carbon dioxide from evaporator stage 60, 61, 62 along with other non-condensable gases that may be released including any air in leakage, is collected in line 25 and is introduced into the evaporator feed water in $CO_2$ absorption tank 31. Valves 26, 27 and 28 are provided to permit adequate removal of gases without excessive removal of water vapor. The vent from flash stage 63 is conveniently connected to the deaerator which operates at a slightly lower pressure and is controlled by valve 29. The loss of $CO_2$ from the system in this arrangement will not be appreciable, since, as stated above, the amount of $CO_2$ released from the brine at the low temperature will be relatively small.

The recycling carbon dioxide may be introduced at various points in the system, but in any event it should be introduced into the feed water before the water enters evaporator heater 37 and preferably before its temperature reaches about 150° F. The introduction of the recycling $CO_2$ into the feed water line at any point after it leaves recycle pump 43 would require auxiliary equipment such as a steam jet compressor, the suction end being connected to the $CO_2$ collection line 25 and the discharge of the compressor to the recycling feed water line.

In FIG. 2, the carbon dioxide released from the flash evaporators is introduced into the $CO_2$ absorption tank 31, preferably below the normal operating level. Periodically, this tank should be vented by means of control valve 23 to remove non-condensable gases that may accumulate, particularly during and shortly after equipment startup when the system may not be completely purged of air. Venting continuously from this tank may be used, provided its pressure is controlled to prevent an excessive amount of $CO_2$ from leaving the system along with water vapor and any non-condensable gases.

As the evaporator feed water flows through line 48, acid may be added thereto from line 58, and mixing of acid and the evaporator feed water is effected by acid mixer 55. The addition of acid from solution tank 95 can be accurately controlled to reduce total alkalinity and adjust the pH to the desired valve by means of a metering pump 46, or other means known in the art.

Another feature of the invention is that supplemental to the $CO_2$ recycle, further depression of the feed water pH value can be accomplished by the addition of carbon dioxide from cylinder 56a. The use of carbon dioxide as the treating chemical, because of the facility with which it can be stored and handled, is particularly advantageous for certain installations such as shipboard, where the storage and handling of other acid compounds may be undesirable or impractical. The carbon dioxide can be stored in steel cylinders or vessels, and its rate of feed can be accurately controlled by means of valve 56 and flow meter 50. The pH meters 57 and 53 can serve as guides for controlling the chemical feed rate.

As illustrative of the invention, the following example is given:

EXAMPLE II

Sea water at the rate of 55,000 lbs./hr. having the approximate composition indicated in column (a) of Table 1 is drawn through line 10 at a temperature of 85° F. of this amount, 10,000 lbs./hr. is diverted through line 15 as a coolant for vent condenser 18 and discharged to waste via line 16. The remainder of 45,000 lbs./hr. at 85° F. is passed through heat exchanger coil 33 of the fourth stage flash evaporator 63 to condense the vapor therein which is at a temperature of about 120° F. and pressure of about 1.65 p.s.i. absolute. The sea water which is heated to about 110° F passes through line 12 where 36,000 lbs./hr. is drawn off as waste via line 16 and the remainder of 9,000 lbs./hr. serves as makeup to deaerator 17 which is maintained at a temperature of about 115° F. and a pressure of about 1.44 p.s.i. absolute by means of vacuum pump 19. Approximately 75 to 100 lbs./hr. of steam from line 40 will be required for deaeration for these conditions.

The evaporator circuit is set up to circulate 34,000 lbs./hr. of a brine make-up mixture from which 3,000 lbs./hr. of fresh water is produced and about 6,000 lbs./hr. of concentrated brine is removed as blowdown. The evaporator makeup of 9,000 lbs./hr. which replaces the liquid removed as fresh water and blowdown, is pumped via 20 into $CO_2$ absorption tank 31 where it is mixed with recycle brine which at this stage amounts to 25,000 lbs./hr. to bring it back to the circulating rate of 34,000 lbs./hr. While the make-up brine is flowing into tank 31, recycle $CO_2$ is being introduced as will be described later. The mixed brine in tank 31 is removed at a temperature of about 118° F. by pump 43 at the rate of 34,000 lbs./hr. via line 48 and passed through coil 34 of third stage evaporator 62. Depending on the pH of the mixture, either or both $CO_2$ and acid may be added prior to pumping the brine mixture into coils 34, 35 and 36, respectively. In this instance, only $CO_2$ is added to supplement the recycle $CO_2$ which results in a feed water composition substantially as shown in Table 1, column (c).

The brine mixture in passing through the heat exchanger coils of the third, second and first stage evaporators 62, 61 and 60, respectively, is preheated to a temperature of about 178° F. just before it enters evaporator heater 37 where it is heated by steam supplied by line 39 at the rate of about 1300 lbs./hr. when at a pressure of 30 p.s.i. absolute and an enthalphy of 1164 B.t.u./lb. The brine mixture leaves evaporator heater 37 at a temperature of about 215° F. where it is controlled via valve 11 to a back pressure above saturation, for example, a pressure of about 20 to 25 p.s.i. absolute to impede dissolved $CO_2$ from leaving the feed water being heated.

The water entering evaporator 60, which is at about 195° F. and 10.17 p.s.i. absolute is flash vaporized wherein $CO_2$ is released, collected and drawn off through valve 26 for recycling purposes, while fresh water is condensed in well 64a. The residue brine leaving evaporator 60 at about 195° F. is flash vaporized in evaporator 61 which is at about 175° F. and 6.56 p.s.i. absolute. The CO₂ released there is likewise collected and drawn off via valve 27 for recycle. The residue brine leaving evaporator 61 is further flash vaporized in 62 which is at about 155° F. and 4.1 p.s.i. absolute. The residue brine from this evaporator is lastly led to the fourth stage evaporator 63 which is at about 120° F. and 1.65 p.s.i. absolute.

At evaporators 60, 61, 62 and 63, the amount of distillate produced and collected in wells 64a is about 680 lbs., 660 lbs., 640 lbs. and 1020 lbs./hr., respectively, coming to a grand total of about 3000 lbs./hr. which is removed by pump 54 via line 50. The residue brine leaving evaporator 63 amounts to about 31,000 lbs./hr. from which 6,000 lbs./hr. are removed as blow-down via line 51 and 25,000 lbs./hr. enters CO₂ absorption tank 31 where it is mixed with 9,000 lbs./hr. of make-up as previously mentioned.

The released CO₂ from evaporators 60, 61 and 62 is collected and drawn off through line 25 and introduced into the brine make-up water mixture in tank 31 as shown in FIG. 2.

It is apparent from the foregoing that many variations of the inventive concept can be practiced. For example, some of the features illustrated by FIG. 1 can be combined with some of the features depicted by FIG. 2 in arriving at other useful combinations of operational steps. Therefore, it is to be appreciated that the disclosure concerning FIGS. 1 and 2 is by way of illustration and not by way of limitation. Thus, while reference is made to a deaerator in FIG. 2, it need not necessarily be employed as a means to remove non-condensable gases, this being also accomplished by the system shown in FIG. 1 wherein CO₂ absorption tank 31 makes possible the removal of non-condensable gases by controlled venting from the top of the tank. This may be achieved by controlling the pressure in tank 31, which favors the solution of CO₂ in the feed water while at the same time favoring the separation of non-condensable gases therefrom.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. A method of recovering potable water from sea water containing non-condensable gases and having carbonate and hydroxide scale-forming characteristics while inhibiting scale formation on heat exchanger surfaces at elevated temperatures in a flash evaporation system comprising a plurality of flash evaporator stages, the combination of steps comprising subjecting heated sea water characterized by the presence of bicarbonate ions to a flash evaporation and recovery cycle in a flash evaporator system at a temperature at which at least a portion of the bicarbonate ions decomposes to form carbon dioxide which when it leaves the water tends to cause an increase in pH conducive to scale formation, forming condensate and removing it from said system, collecting the carbon dioxide and other non-condensable gases released during said flash evaporation, introducing said collected carbon dioxide into sea water prior to evaporation in said flash evaporator system while venting non-condensable gases, said carbon dioxide being introduced into said sea water before said sea water prior to evaporation is preheated up to 150° F., conducting said sea water containing the added carbon dioxide to an evaporator preheater in said system, heating said sea water to an elevated temperature exceeding 170° F. while maintaining said sea water during heating at a pressure greater than the pressure at which said sea water boils at said elevated temperature whereby to maintain carbon dioxide dissolved in said sea water and inhibit scale formation in said evaporator preheater, and then subjecting said sea water to flash evaporation.

2. A method of recovering potable water from sea water containing non-condensable gases and having carbonate and hydroxide scale-forming characteristics while inhibiting scale formation on heat exchanger surfaces at elevated temperatures in a flash evaporation system comprising a plurality of flash evaporator stages, the combination of steps comprising mixing an acid with the sea water in the system to reduce the total carbonate alkalinity therein to below 100 p.p.m. as determined by titration with a standard acid to a methyl orange endpoint, subjecting the acid treated sea water characterized by the presence of bicarbonate ions to a flash evaporation and recovery cycle in a flash evaporator system at a temperature at which at least a portion of the bicarbonate ions decomposes to form carbon dioxide which when it leaves the water tends to cause an increase in pH conducive to scale formation, forming condensate and removing it from said system, collecting the carbon dioxide and other non-condensable gases released during said flash evaporation, and introducing said collected carbon dioxide into the acid treated sea water to be heated in said flash evaporator system while venting said other non-condensable gases, said carbon dioxide being introduced into said sea water before said sea water prior to evaporation is preheated up to 150° F., conducting said sea water containing the added carbon dioxide to an evaporator preheater in said system, heating said sea water to an elevated temperature exceeding 170° F. while maintaining said sea water during heating at a pressure greater than the pressure at which said sea water boils at said elevated temperature whereby to maintain carbon dioxide dissolved in said sea water and inhibit scale formation in said evaporator preheater, and then subjecting said sea water to flash evaporation.

3. A method of recovering potable water from sea water containing non-condensable gases and having carbonate and hydroxide scale-forming characteristics while inhibiting scale formation on heat exchanger surfaces at elevated temperatures in a flash evaporation system comprising a plurality of flash evaporator stages, the combination of steps comprising subjecting sea water characterized by the presence of bicarbonate ions to a flash evaporation and recovery cycle in a flash evaporator system at a temperature at which at least a portion of the bicarbonate ions decomposes to form carbon dioxide which when it leaves the water tends to cause an increase in pH conducive to scale formation, forming condensate and removing it from said system, whereby a brine residue concentrate is formed, collecting the carbon dioxide and other non-condensable gases released during said flash evaporation, removing and discarding a portion of said brine residue and replacing said portion with sea water to form a brine residue-sea water mixture, introducing said collected carbon dioxide into said water mixture prior to evaporation in the flash evaporator system while venting said other non-condensable gases, said carbon dioxide being introduced into said sea water before said water mixture prior to evaporation is preheated up to 150° F., conducting said water mixture containing the added carbon dioxide to an evaporator preheater in said system, mixing an acid into said water mixture to reduce the pH value below 8 before the mixture enters the evaporator preheater, heating said mixture in the evaporator heater to an elevated temperature exceeding 170° F. while maintaining said mixture during heating at a pressure greater than the pressure at which said water mixture boils at said elevated temperature whereby to maintain carbon dioxide dissolved in said sea water and inhibit scale formation in said evaporator heater and then subjecting said sea water to flash evaporation.

References Cited by the Examiner

UNITED STATES PATENTS

| | | | |
|---|---|---|---|
| 1,935,670 | 11/1933 | Rummel | 210—59 |
| 2,182,286 | 12/1939 | Doennecke et al. | 210—57 |
| 2,756,208 | 7/1956 | Axelrad et al. | |
| 2,759,882 | 8/1956 | Worthen et al. | 202—174 X |
| 2,807,574 | 9/1957 | Hirano et al. | 202—67 X |
| 2,904,511 | 9/1959 | Donath | 210—59 |
| 2,921,004 | 1/1960 | Wood | 202—53 X |
| 3,080,302 | 3/1963 | Rogers et al. | |

OTHER REFERENCES

"Betz Handbook of Industrial Water Conditioning," fifth edition, Betz Laboratories, Inc., 1957, Philadelphia, Pa. (pg. 44–46 relied upon).

Ellis: "Fresh Water From The Ocean," published by Ronald Press Co., N.Y., 1954 (page 154 relied upon).

NORMAN YUDKOFF, *Primary Examiner.*

ALPHONSO D. SULLIVAN, RICHARD D. NEVIUS, *Examiners.*